US012083542B1

(12) United States Patent
Vanni et al.

(10) Patent No.: US 12,083,542 B1
(45) Date of Patent: Sep. 10, 2024

(54) ATTACHMENT TOOL FOR A CLEANING DEVICE

(71) Applicant: Steven Vanni, North Miami, FL (US)

(72) Inventors: Steven Vanni, North Miami, FL (US); John Souza, Monroe, NC (US)

(73) Assignee: Steven Vanni, North Miami, FL (US)

( * ) Notice: Subject to any disclaimer, the term of this patent is extended or adjusted under 35 U.S.C. 154(b) by 0 days.

(21) Appl. No.: 18/447,256

(22) Filed: Aug. 9, 2023

(51) Int. Cl.

| | |
|---|---|
| ***A47L 5/36*** | (2006.01) |
| ***A47L 9/06*** | (2006.01) |
| ***A47L 13/11*** | (2006.01) |
| ***B05B 1/00*** | (2006.01) |
| ***B05B 15/65*** | (2018.01) |
| ***B08B 5/02*** | (2006.01) |
| *A47L 9/32* | (2006.01) |

(52) U.S. Cl.
CPC ............ *B05B 1/005* (2013.01); *A47L 9/0613* (2013.01); *A47L 13/11* (2013.01); *B05B 15/65* (2018.02); *B08B 5/02* (2013.01)

(58) Field of Classification Search
CPC .. A47L 11/4044; A47L 9/0626; A47L 7/0009; A47L 9/02; A47L 9/06; A47L 9/0666; A47L 9/0673; A47L 9/0606; A47L 9/0613; B05B 1/005; B05B 5/02
USPC ........................................................... 15/419
See application file for complete search history.

(56) References Cited

U.S. PATENT DOCUMENTS 1,655,585 A 1/1928 Wagner
1,656,208 A 1/1928 Le Vora
1,747,258 A 2/1930 O'Neil
1,783,506 A 12/1930 Homiller
2,246,640 A 6/1941 Shurhay
2,677,144 A * 5/1954 Parry .................... A47L 7/0009 15/245
2,893,046 A * 7/1959 Thompson ................ A47L 9/02 15/325
3,082,467 A 3/1963 Wells
3,584,330 A 6/1971 Wallin et al.
(Continued)

OTHER PUBLICATIONS

A.E.C. Engineering Systems, "Air Wand," Santee, California, United States of America, www.airwand.com.

*Primary Examiner* — Bryan R Muller
(74) *Attorney, Agent, or Firm* — McNees Wallace & Nurick LLC

(57) ABSTRACT

An air blade tool operable as a surface and crevice cleaning tool is provided. The air blade tool includes a housing assembly, blade assembly, and air conduit assembly adapted for mounting to an air blower. The housing assembly includes a housing, a handle, a blade retainer seat, and openings for emitting air. The blade retainer seat may comprise one or more blade supports. The housing assemblies may include a fastener system for releasably securing interchangeable blades at predetermined positions along the length of the housing. The blade assembly includes at least a blade and in some embodiments a blade retainer. The air conduit assembly includes an air conduit and may include a swivel fitting for engagement with an air blower for enabling relative movement of the fitted blower to minimize hindrance of control of the air blade tool during use. The housing assembly may further include a damper within the housing and actuator to control the position of the damper and permit selection of the direction of air flow.

20 Claims, 17 Drawing Sheets

(56) References Cited

U.S. PATENT DOCUMENTS

| | | | | | |
|---|---|---|---|---|---|
| 4,091,496 | A * | 5/1978 | Desrosiers | A47L 9/02 | 15/421 |
| 4,475,265 | A * | 10/1984 | Berfield | A47L 7/0009 | 15/415.1 |
| 5,168,599 | A * | 12/1992 | Williams | A47L 7/0009 | 15/387 |
| 5,184,372 | A | 2/1993 | Mache | | |
| 5,189,757 | A * | 3/1993 | Williams | A47L 5/30 | 15/323 |
| D488,599 | S | 4/2004 | Chika | | |
| 9,420,927 | B2 * | 8/2016 | Ventress | A47L 9/062 | |
| D812,831 | S * | 3/2018 | Lutz | D32/32 | |
| 10,238,256 | B2 * | 3/2019 | Cole | A47L 9/0666 | |
| 2010/0236017 | A1 * | 9/2010 | Krebs | A47L 9/0666 | 15/363 |

* cited by examiner

ATTACHMENT TOOL FOR A CLEANING DEVICE

FIELD OF DISCLOSURE

The present disclosure relates to a handheld attachment tool that may be used as an air blade tool that is attachable to a cleaning device, more specifically, an air blower, the air blade tool operable as a surface and crevice cleaning tool.

BACKGROUND

Prior art devices include scraping tools, such as squeegees and rigid scrapers, that help the user of the device remove contaminants, ice, and moisture from the surface of a cleaning area, for example, a window or floor. Some prior art devices combine scraping tools with a mechanism of blowing or spraying air or water and suctioning to clean and dry a surface of a cleaning area. Such scraping and air/water flow devices are large, bulky, or make it difficult or inconvenient for the user to accomplish the given task. Many are adapted for use upright on floors, while others are simply attachments that extend the distal end of hoses and rigid mops and don't allow for comfortable handling and control by the user.

There remains a need for a handy and convenient air blade tool for attachment to an air blower that blows air while the user of the air blower is gently scraping or wiping the surface of a cleaning area and improves operator comfort and effectiveness.

SUMMARY

Provided herein in various embodiments is an air blade tool for attachment to an air blower, the air blade tool operable as a surface and crevice cleaning tool. In some embodiments, the tool may be integral with or include a dedicated air blower. In various embodiments, the tool is a handheld air blade tool wherein the term air blade refers to the feature of delivering a blade of air directed to a surface or crevice for directing the displacement of debris or water using the air blade delivered by the air blade tool.

In various embodiments, the air blade tool includes a housing assembly, a blade assembly, and an air conduit assembly adapted for mounting to an air blower. The housing assembly includes a housing, a handle, a blade retainer seat, and openings for emitting air. The blade retainer seat may comprise one or more blade supports. The housing assembly may include a fastener system for releasably securing interchangeable blades at predetermined positions along the length of the housing. The blade assembly includes at least a blade and in some embodiments a blade retainer. The air conduit assembly includes an air conduit and may include a swivel fitting for engagement with an air blower for enabling relative movement of the fitted blower to minimize hindrance of control of the air blade tool during use and to avoid interference of the attached blower with the arm of a user holding the too. The housing assembly may further include a damper within the housing and actuator to control the position of the damper and permit selection of the direction of air flow.

In a first embodiment, provided is an air blade tool operable as a surface and crevice cleaning tool, the air blade tool comprising a housing assembly including a housing having a top and bottom and a hollow inside, and first and second ends, a handle extending from the housing and disposed at the top of the housing and along a length of the housing between its first and second ends, a blade retainer seat disposed along the bottom of the housing and configured to slidably receive a blade assembly, and openings disposed at the bottom of the housing for emitting air.

According to such embodiments, the air blade tool also includes a blade assembly including at least a blade, and an air conduit assembly including an air conduit having a proximal end and distal end, the air conduit connected at its proximal end to extend from the first or second end of the housing and adapted at its distal end for mounting to an air blower, whereby air supplied from the air blower through the air conduit forms air flow inside the housing.

According to such embodiments, the blade assembly is replaceable, and the housing assembly includes a fastener, a fastener mounting seat, and a slot configured to receive the fastener, wherein the fastener is configured to engage in the fastener mounting seat and through the slot to contact and releasably secure the blade assembly within the blade retainer seat at a predetermined position.

In some embodiments, the blade assembly includes only a blade that is adapted for engagement within the blade retainer seat.

In some embodiments, the blade assembly includes a blade and blade retainer, wherein the blade retainer is either integral with the blade or is affixed to the blade, the blade retainer adapted for engagement within the blade retainer seat.

In some embodiments, the fastener is selected from the group consisting of a bolt, a screw, a clamp, a pin and combinations thereof.

In some embodiments, the blade is one of a squeegee, a cloth scrubber, or a brush.

In some embodiments, the blade is tapered downward and away from the blade retainer seat. In some embodiments, the blade includes a squeegee that includes a cloth surface on at least one side.

In some embodiments, the blade includes a squeegee formed from an elastic material.

In some embodiments, the elastic material is a rubber, a silicone or a combination thereof.

In some embodiments, the air conduit extends from one end of the housing at the proximal end along a first axis at a first angle and continues to extend to the distal end along a second axis at a second angle.

In some embodiments, the air conduit includes a cylindrical hollow tube, and the air conduit assembly further comprises a swivel fitting to allow rotation of a hose relative to the air blade tool when fitted to the air conduit.

In some embodiments, the housing assembly further comprises a damper inside the housing, wherein the air flow inside the housing is directed by the position of the damper to predetermined openings at the bottom of the housing.

In another embodiment, provided is an air blade tool operable as a surface and crevice cleaning tool. The air blade tool comprising a housing assembly including a housing having a top and bottom and a hollow inside, and first and second ends, a handle extending from the housing and disposed at the top of the housing, a blade retainer seat disposed along the bottom of the housing and configured to slidably receive a blade assembly, and openings disposed at the bottom of the housing.

According to such embodiments, the air blade tool also includes a blade assembly comprising at least a blade, a damper positioned within the housing and configured to be adjustably positionable to be disposed at a predetermined position, the predetermined position comprising at least one predetermined position, the damper configured to adjustably direct air flow inside the housing to at least one opening, and an actuator configured to control the position of the damper.

According to such embodiments, the air blade tool also includes an air conduit assembly including an air conduit having a proximal end and distal end, the air conduit connected at its proximal end to extend from the first or second end of the housing and adapted at its distal end for mounting to an air blower, whereby air supplied from the air blower through the air conduit forms air flow inside the housing.

In some embodiments, the actuator is configured to be locked at a predetermined position, and the predetermined position comprises at least one predetermined position.

In some embodiments, the blade assembly is integral with the air blade tool and not replaceable.

In some embodiments, the blade assembly is replaceable, the housing assembly including a fastener, a fastener mounting seat, and a slot configured to receive the fastener, wherein the blade retainer seat is configured to slidably receive the blade assembly, and the fastener is configured to engage in the fastener mounting seat and through the slot to contact and secure the blade assembly within the air blade tool at a predetermined position.

In some embodiments, the blade assembly includes a blade and blade retainer, wherein the blade retainer is either integral with the blade or is affixed to the blade, the blade retainer adapted for engagement within the blade retainer seat.

In some embodiments, the blade is one of a squeegee, a cloth scrubber, or a brush.

In some embodiments, the air conduit includes a cylindrical hollow tube, and the air conduit assembly further comprises a swivel fitting to allow rotation of a hose relative to the air blade tool when fitted to the air conduit.

In another embodiment, provided is an air blade tool operable as a surface and crevice cleaning tool, the air blade tool comprising a housing assembly including a housing having first and second ends, a top and bottom, and a hollow inside, a handle extending from the top of the housing and disposed along the top of the housing and from substantially the first to the second end, a blade retainer seat disposed along the bottom of the housing and configured to slidably receive a removable blade.

According to such embodiments, the air blade tool also includes a blade comprising a squeegee formed of elastomeric or cloth material or a combination thereof, openings disposed at the bottom of the housing along at least a portion of a length from the first to the second end, a damper positioned within the housing and configured to be adjustably positionable to be disposed at a predetermined position, the predetermined position comprising at least one predetermined position, the damper configured to redirect the air flow inside the housing to at least one opening, and an actuator configured to control the position of the damper.

According to such embodiments, the air blade tool also includes an air conduit assembly including an air conduit, the air conduit having a proximal and distal end, the air conduit connected at its proximal end to extend from the first or second end of the housing and adapted at its distal end for mounting to an air blower, whereby air supplied from the air blower through the air conduit forms air flow inside the housing, and the air conduit assembly includes a swivel fitting.

In some embodiments, the housing assembly includes a fastener, a fastener mounting seat, and a slot configured to receive the fastener, wherein the fastener is configured to engage in the fastener mounting seat and through the slot to contact and secure the blade assembly within the air blade tool at a predetermined position.

In another embodiment, provided are methods of cleaning of surfaces and crevices, for example, the surfaces of cars after cleaning to allow for the removal of water from the surface without introduction of wipe marks and to avoid water spotting. Other uses include removal of particulates and air from surfaces, or from crevices, such as in window wells and other joints. Operation of the replaceable blade allows ready switching of blades of different types for different surfaces, or to replace spent blades. Operation of the swivel ensures that the handle and blade positions remain true to the treated surface despite kinking or winding of a hose affixing the tool to a blower, with the further benefit of avoiding hand fatigue for the user. And operation of the damper enables the user to select the direction of air flow to one side, or both sides of the bottom of the housing whereby selection of one side or the other prevents blow back of particulates and water toward a direction of the surface or crevice that has been cleaned or wiped of water.

Other features and advantages of the present invention will be apparent from the following more detailed description of exemplary embodiments, taken in conjunction with the accompanying drawings, which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION

Provided herein is an exemplary air blade tool for attachment to an air blower operable as a surface and crevice cleaning tool. In some embodiments, the air blade tool may be provided with a dedicated air blower and may be integral with or adapted for removably attached to a dedicated air blower. In other embodiments, the air blade tool is adapted to attach via a generic fitting on the air conduit to a hose or other extension from a separate blowing device, such as a leaf blower or shop vacuum. Example embodiments of the present disclosure provide for a handy and convenient air blade tool that attaches to an air blower, blows contaminants on the surface of a cleaning area while a blade of the air blade tool, e.g., a squeegee, gently scrapes or wipes the surface of the cleaning area, and enables the user of the air blade tool quick and easy cleaning. As used herein, an air blower may be selected from conventional tools including but not limited to a shop vacuum operated in blowing mode, a leaf or other lawn care blower, or such other appliance adapted to blow air.

The present disclosure describes exemplary embodiments of the air blade tool for attachment to an air blower operable as a surface and crevice cleaning tool. In an exemplary embodiment, an air blade tool operable as a surface and crevice cleaning tool includes a housing assembly, a blade assembly, and an air conduit assembly. The housing assembly may include a housing, a handle, a blade retainer seat, and openings for emitting air flow from the tool, and in some embodiments, a support and a fastener. The blade assembly includes at least a blade and may include a blade retainer. The air conduit assembly includes an air conduit and may include a swivel fitting. The air conduit is adapted for mounting to an air blower, for example, a blower hose, and may include a swivel fitting at the connection to the air blower. In some embodiments, the fastener secures the blade assembly at a predetermined position. The housing assembly may further include a damper inside the housing and an actuator. The actuator may control the position of the damper and redirect air flow, and the actuator may be a switch or button or other mechanism for directing the orientation of the damper for selectively directing the flow of air along one side of the housing and blade.

Figure 1:
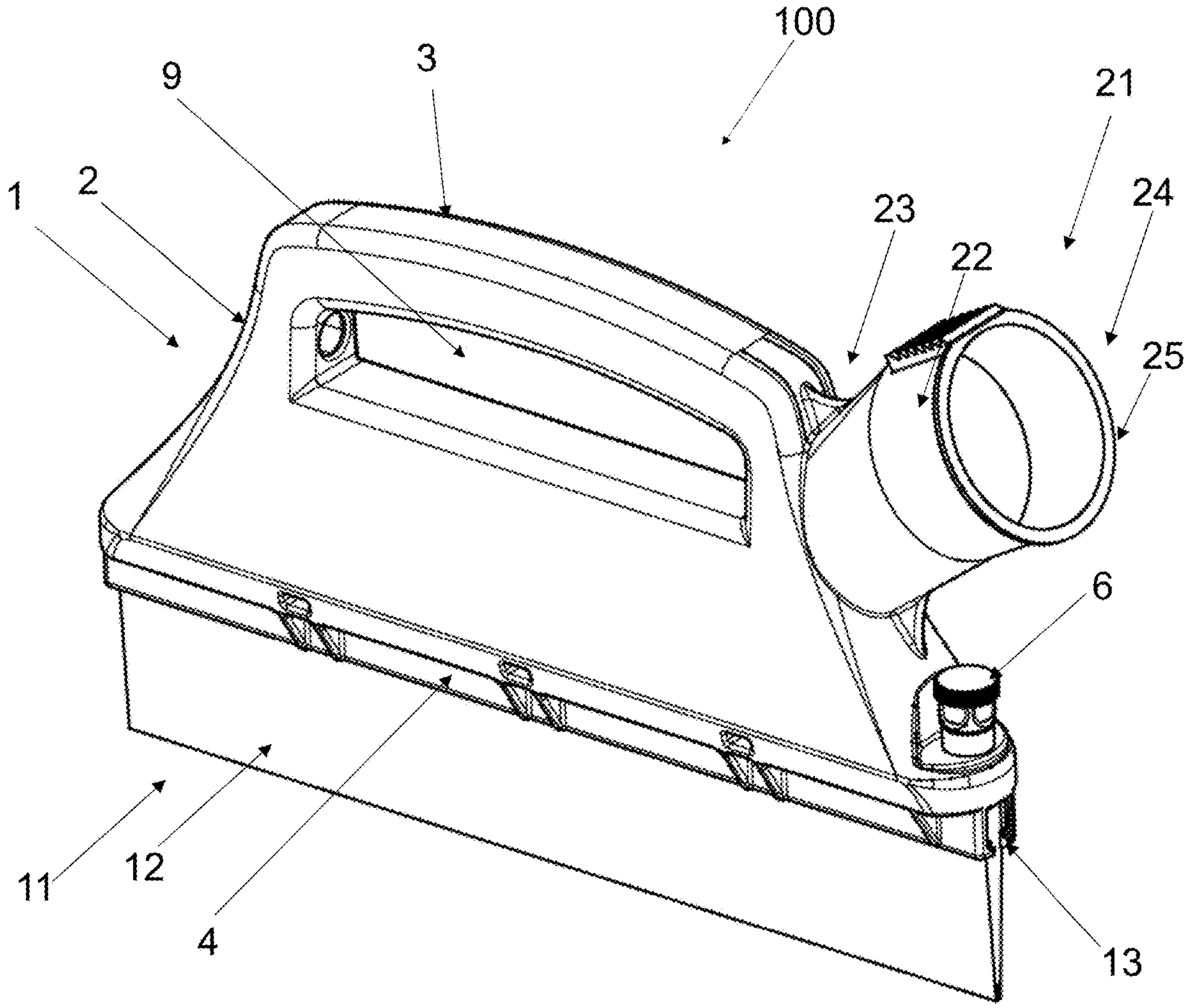
FIG. 1 is an upper front perspective view of an exemplary air blade tool operable as a surface and crevice cleaning tool.
Figure 2:
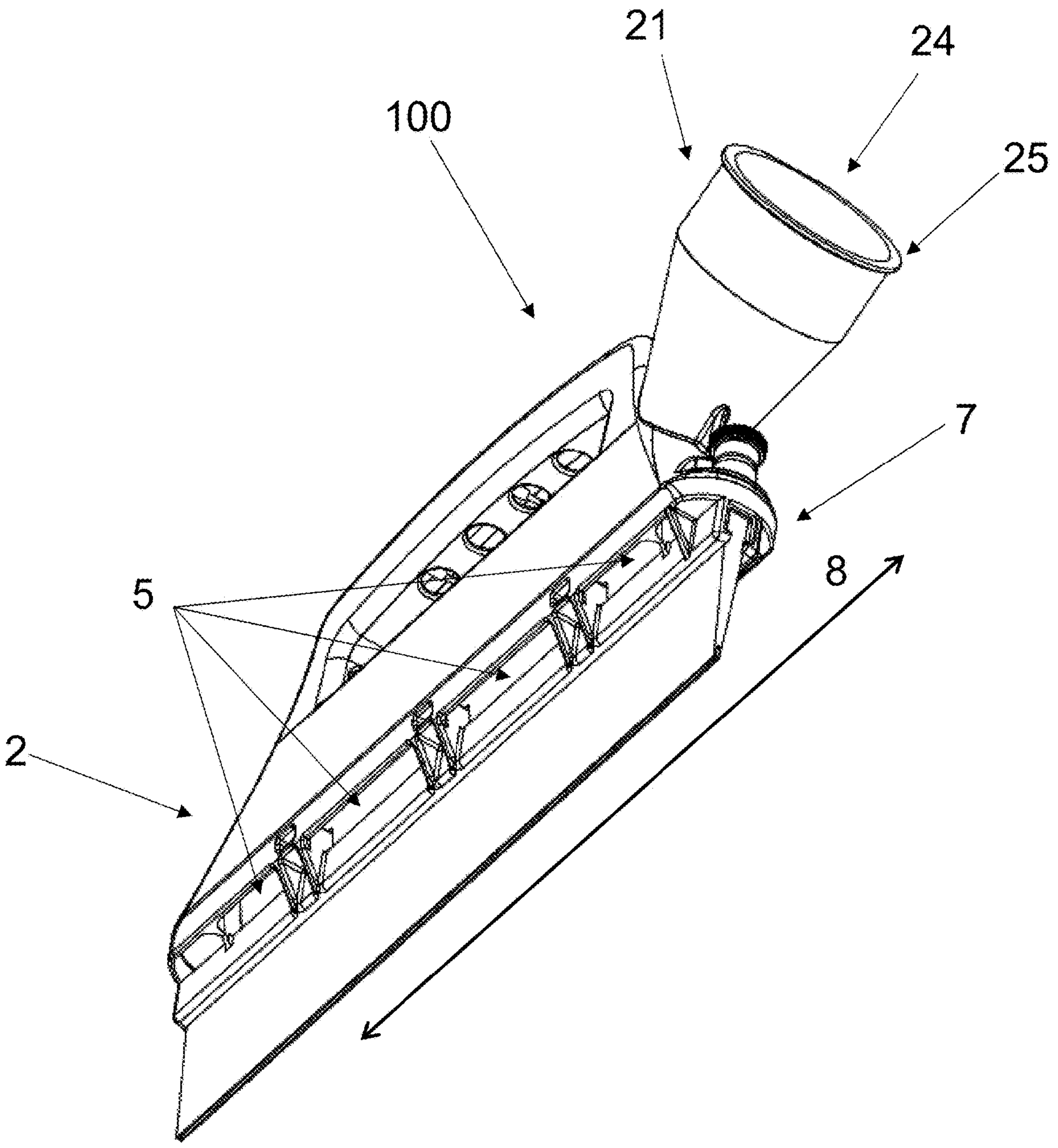
FIG. 2 is a bottom front perspective view of the tool shown in FIG. 1.
Figure 3:
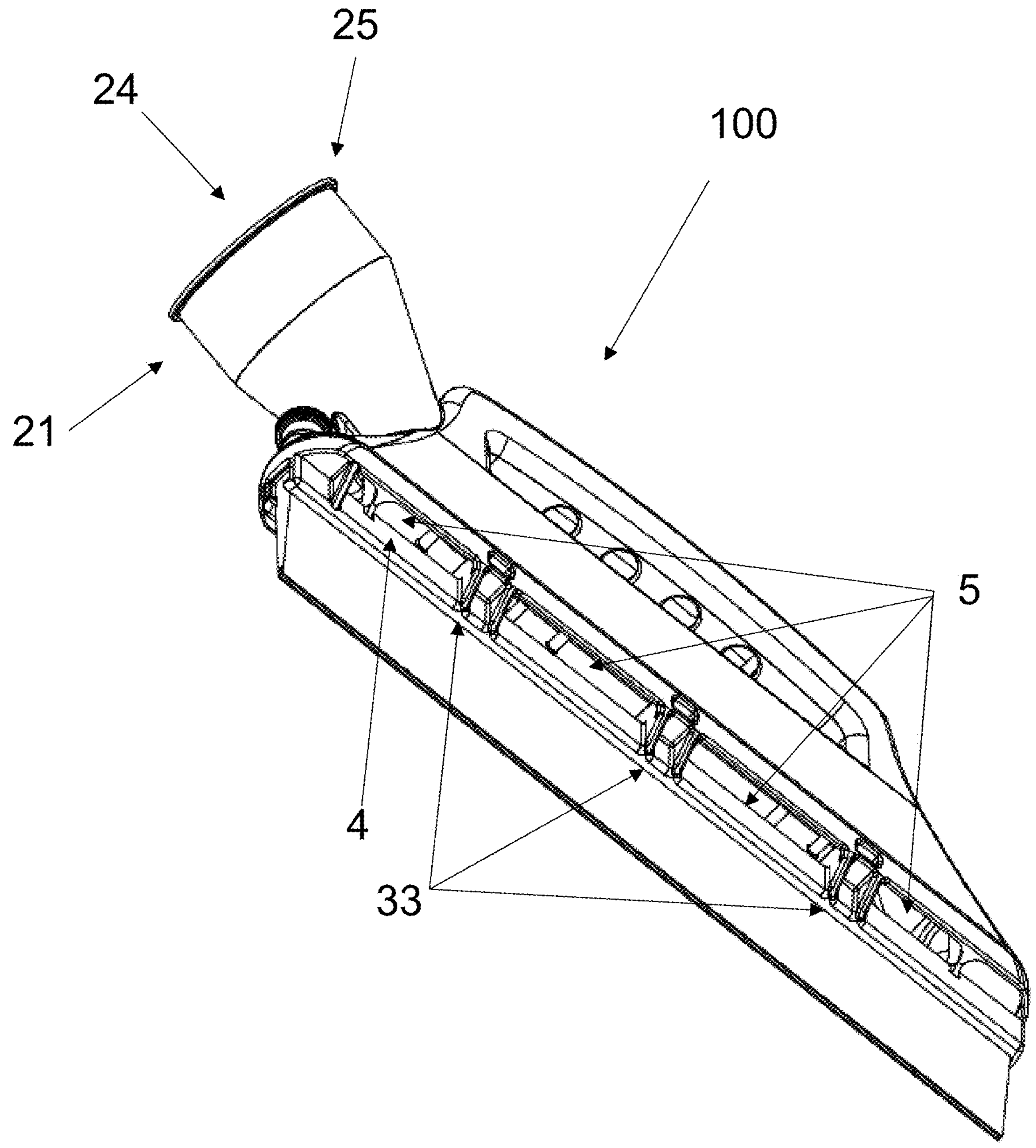
FIG. 3 is a bottom rear perspective view of the tool shown in FIG. 1.

Referring to FIGS. 1-3, in one exemplary embodiment, an air blade tool 100 for an air blower operable as a surface and crevice cleaning tool is shown. The air blade tool 100 includes a housing assembly 1, blade assembly 11, and air conduit assembly 21. The housing assembly 1 includes a housing 2, a handle 3, a blade retainer seat 4, openings 5 (as shown in FIGS. 2 and 3), and a fastener 6. The blade assembly includes at least a blade 12 and in some embodiments a blade retainer 13 as shown in FIGS. 1-3. When the blade assembly 11 includes only a blade 12, the blade 12 is adapted for engagement within the blade retainer seat 4, and the blade 12 is received and secured within the air blade tool 100 at a predetermined position. The blade retainer 13 may be integral with the blade 12 or attachable to the blade 12. In some embodiments, the blade retainer 13 as an integral portion of the blade 12, is not a separate component. In other embodiments, the blade retainer 13 is configured to be affixed to the blade 12, and the blade retainer 13 and blade 12 are separate components of the blade assembly 11. Whether the blade retainer 13 is integral with the blade 12 or is affixed to the blade 12, the blade retainer 13 is adapted for engagement within the blade retainer seat 4, and the blade retainer 13 is received and secured within the air blade tool 100 at a predetermined position.

The housing 2 may have various shapes. Referring to the drawings, for example in FIGS. 1, 2, 8, and 9, in some embodiments, the housing 2 has a generally frustum shape having a top and bottom, two ends 34, 34', and sides. The two ends 34, 34' have varying curvatures along the ends 34, 34' extending from the top to the bottom of the housing 2. The top and bottom It should be appreciated that other shapes and sizes may be employed.

Referring again to the drawings, for example in FIGS. 1-4, in some embodiments, the air conduit assembly 21 includes an air conduit 22 that includes a cylindrical hollow tube and extends from one end 34, 34' of the housing 2 at its proximal end 23, and the air conduit 22 is adapted for mounting to an air blower (not shown) at its distal end 24. Of course, it will be appreciated that in some embodiments, the air conduit assembly 21 may be formed cylindrical tubes or other shaped tubes that may be rigid, semirigid, or flexible and as such may be flexible and reinforced with ribs or other features. Further, while the air conduit 22 is shown at its proximal end 23 as integral with the housing 2, in alternate embodiments, as described herein, the air conduit 22 may be affixed via a joint with the housing 2.

Referring again to FIG. 1, in some embodiments, the handle 3 extends from the housing 2 and is disposed at the top of the housing 2 along a length of the housing 2 between its first and second ends 34, 34'. Both sides of the handle 3 are connected to the housing 2 and form an aperture 9 such that the user of the air blade tool 100 is able to carry and move the tool 100 conveniently and firmly grab the handle 3 while in use. One side of the handle 3 is more proximate to the air conduit assembly 21 than the other side of the handle 3. In some embodiments, the handle 3 may be disposed along the top of the housing 2 substantially from the first to the second end 34, 34'. Yet, in other embodiments, the handle 3 may be disposed at the middle of the top of the housing 2. It should be appreciated that other shapes and sizes may be employed.

Figure 4:
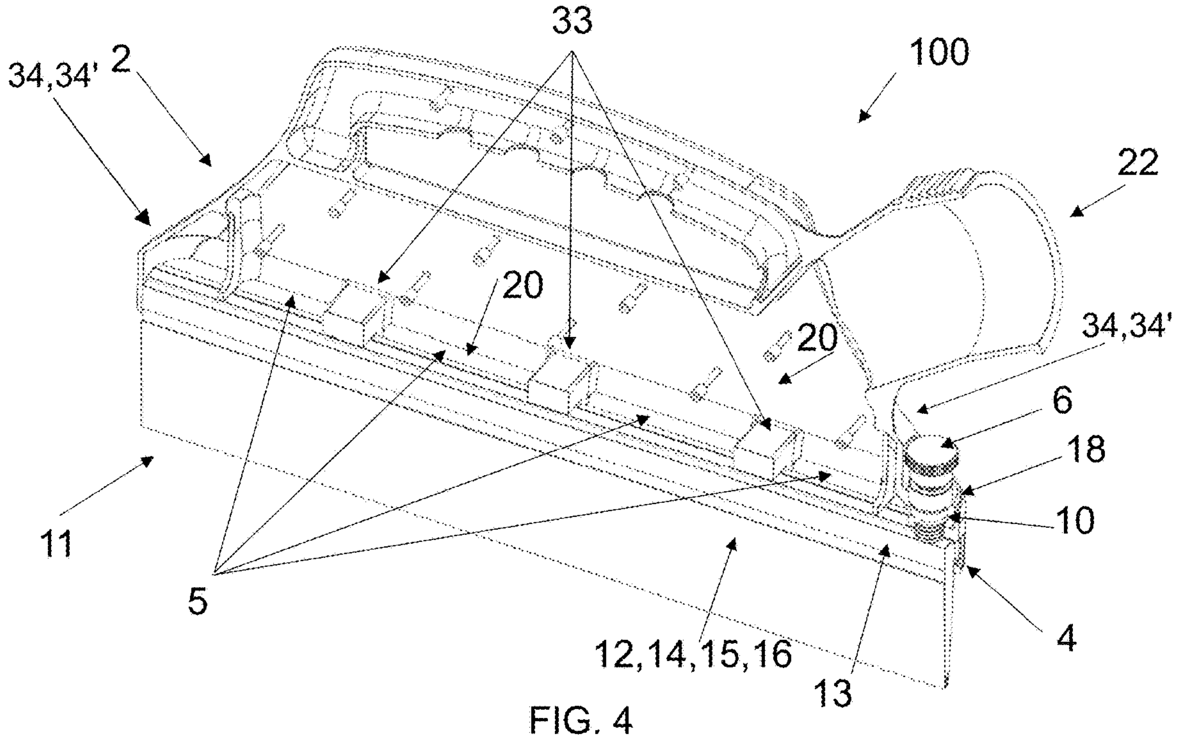
FIG. 4 is a view showing an arrangement of the tool shown in FIG. 1.
Figure 5:
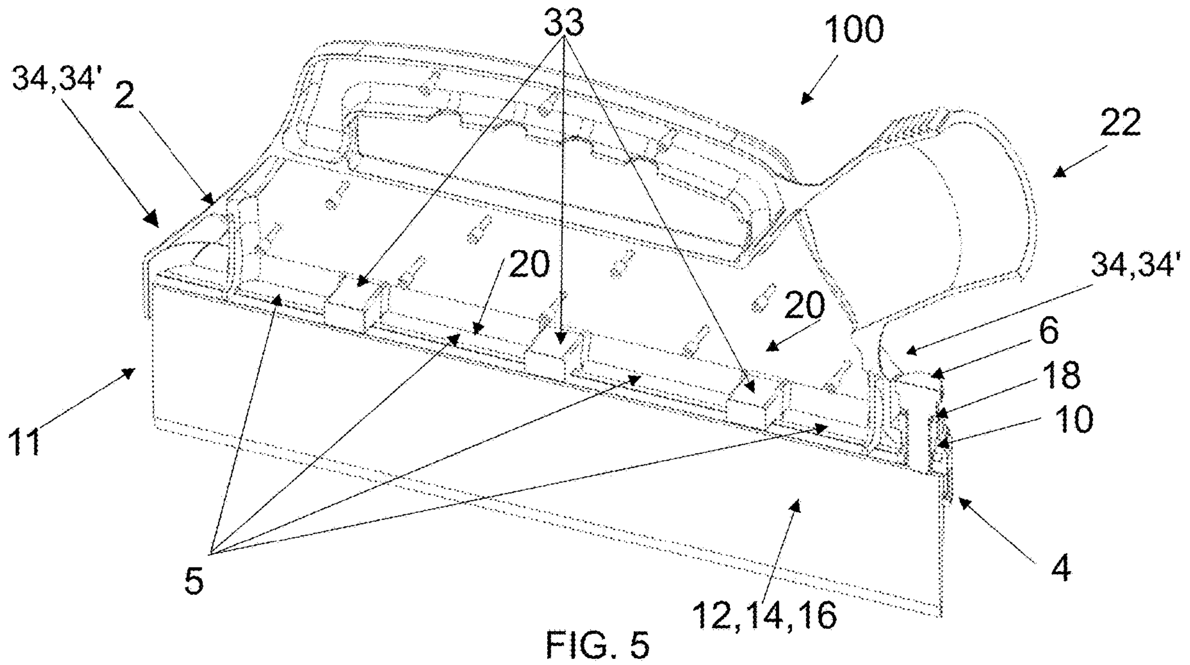
FIG. 5 is a longitudinal cross section view of the tool shown in FIG. 1.
Figure 6:
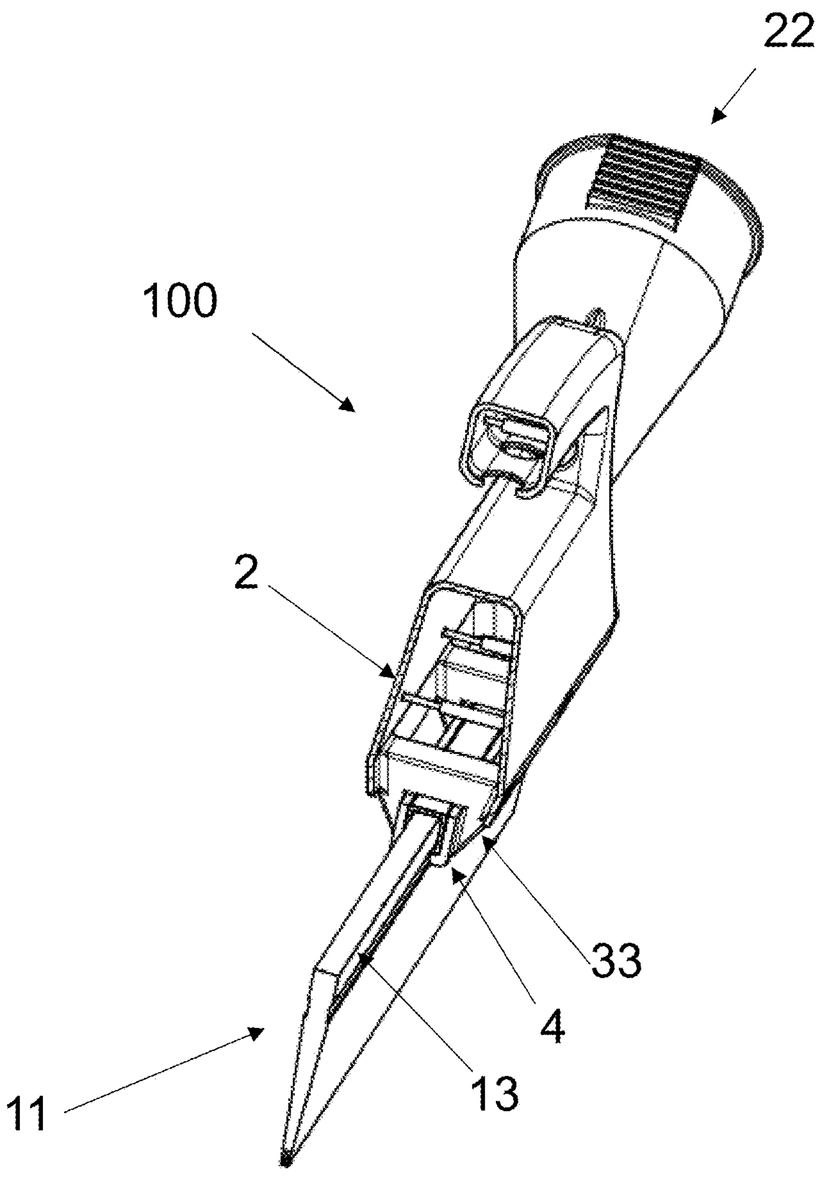
FIG. 6 is a transverse cross section view of the tool shown in FIG. 1.
Figure 7:
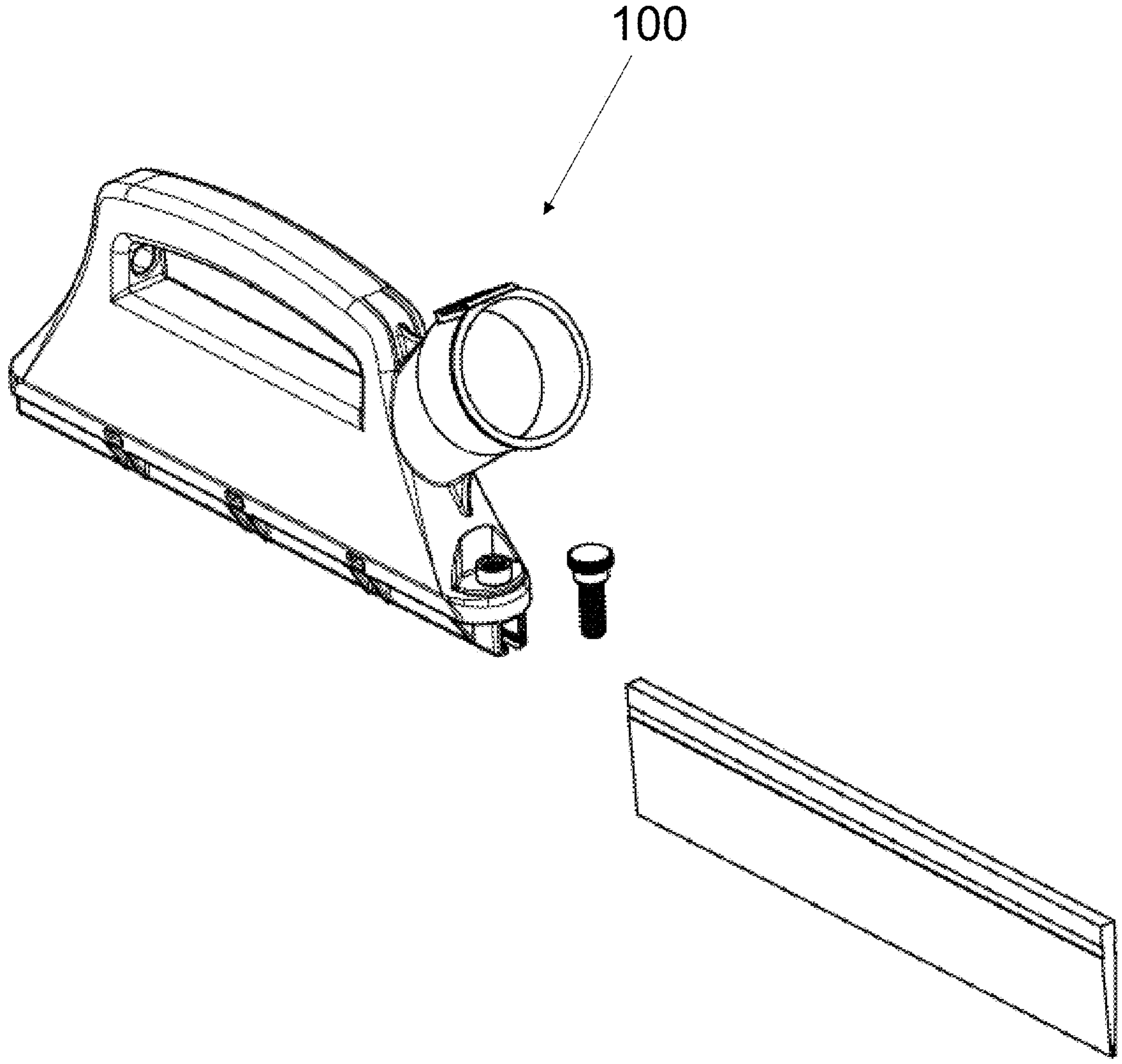
FIG. 7 is an exploded view of the tool shown in FIG. 1.
Figure 8:
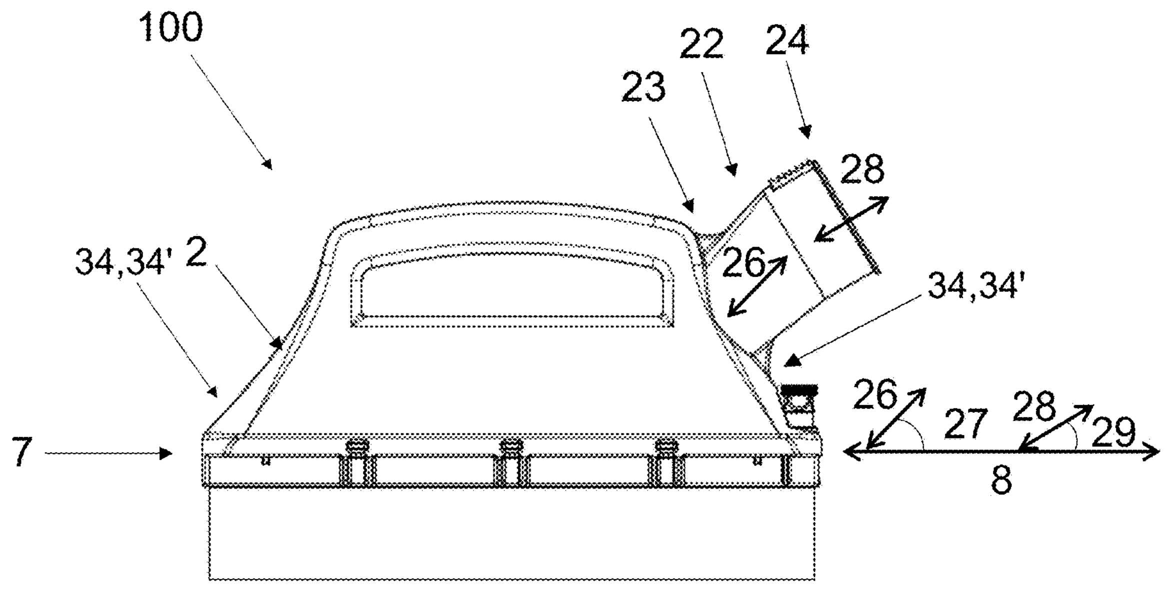
FIG. 8 is a front view of the tool shown in FIG. 1.
Figure 9:
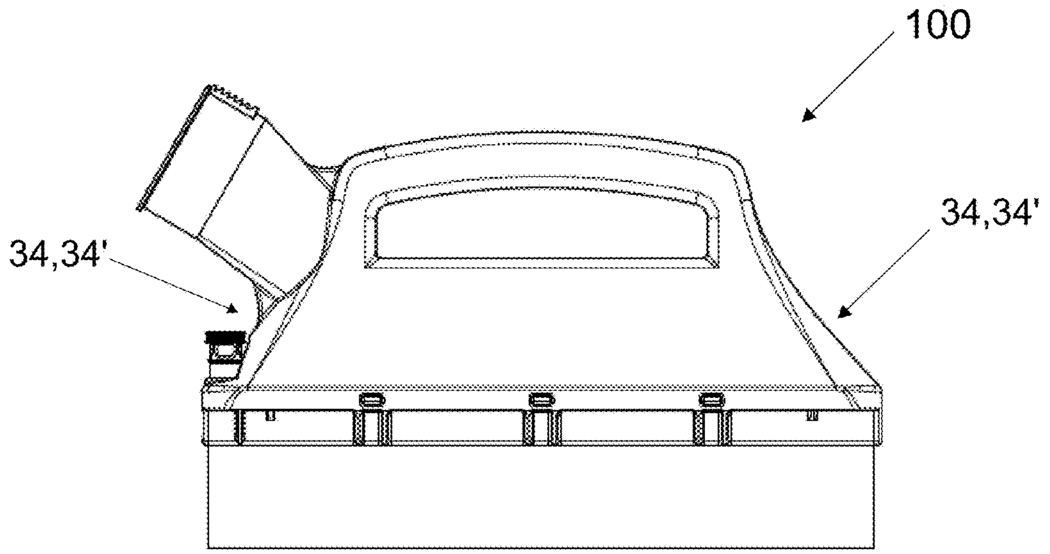
FIG. 9 is a rear view of the tool shown in FIG. 1.
Figure 10:
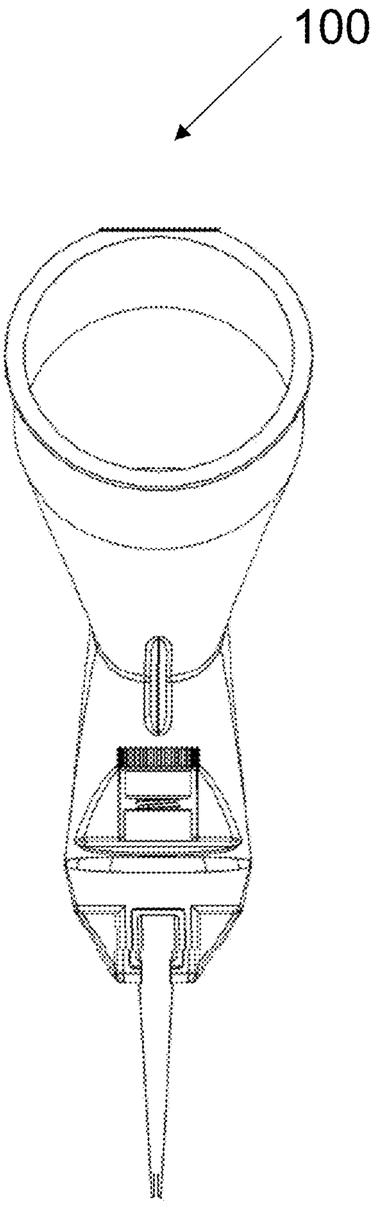
FIG. 10 is a right side view of the tool shown in FIG. 1.
Figure 11:
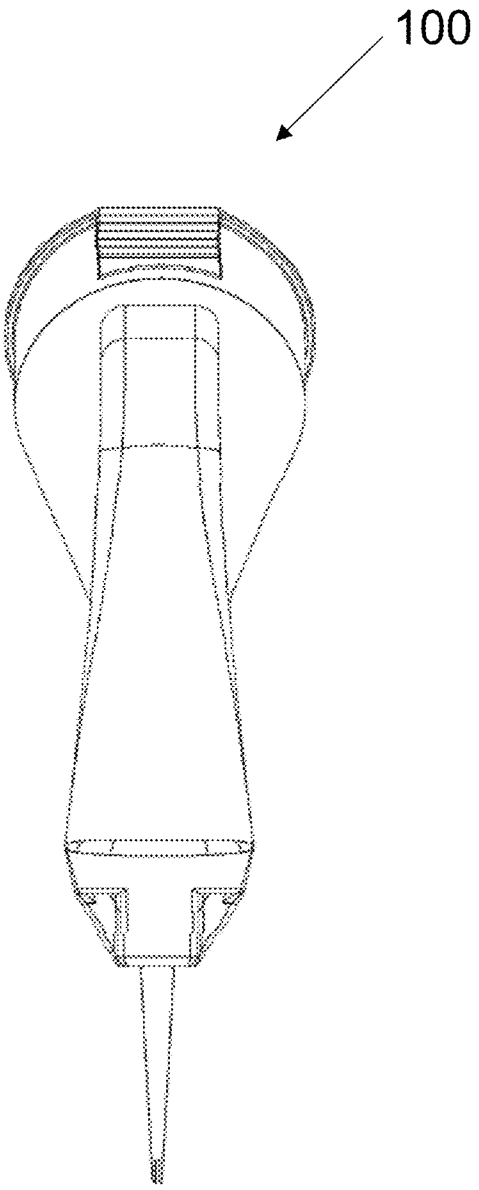
FIG. 11 is a left side view of the tool shown in FIG. 1.
Figure 12:
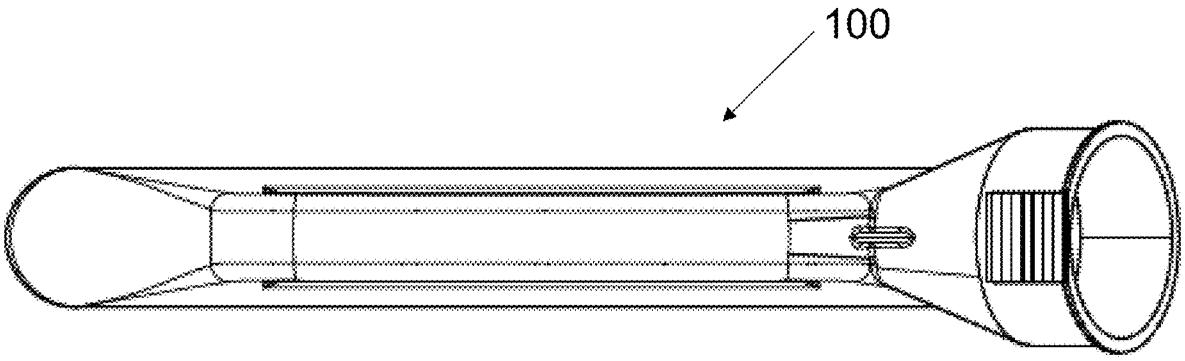
FIG. 12 is a top view of the tool shown in FIG. 1.

Referring to FIGS. 4-6, the housing 2 is hollow so that air supplied from an air blower (not shown) through the air conduit 22 blows out through the openings 5 and removes contaminants on the surface of a cleaning area. The sizes and shapes of the housing 2 may vary to meet different needs. The housing 2 may be made from a plastic material and/or a metal material.

The blade retainer seat 4 is disposed along the bottom of the housing 2. The blade retainer seat 4 is configured to slidably receive a blade retainer 13 of a blade assembly 11. In some embodiments, a blade retainer seat 4 may further include one or more supports 33 which reinforce and stabilize the blade assembly 11 within the blade retainer seat 4. Referring again to FIG. 3, the support 33 can be extended from the bottom of the housing 2 and hold the blade retainer seat 4 in place. The support 33 may be more than one and disposed in an equidistant manner. In other embodiments, supports 33 may be disposed in a non-equidistant manner. It should be appreciated that other mechanisms, shapes, dimensions, and sizes may be employed.

Figure 13:
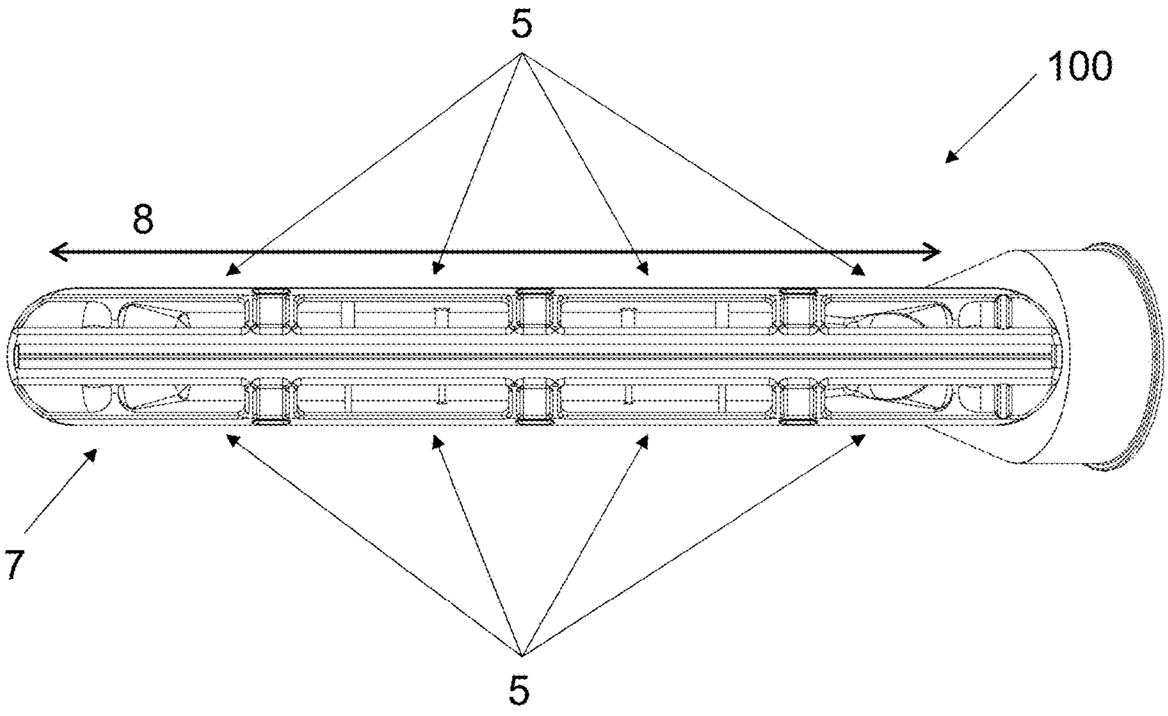
FIG. 13 is a bottom view of the tool shown in FIG. 1.
Figure 14:
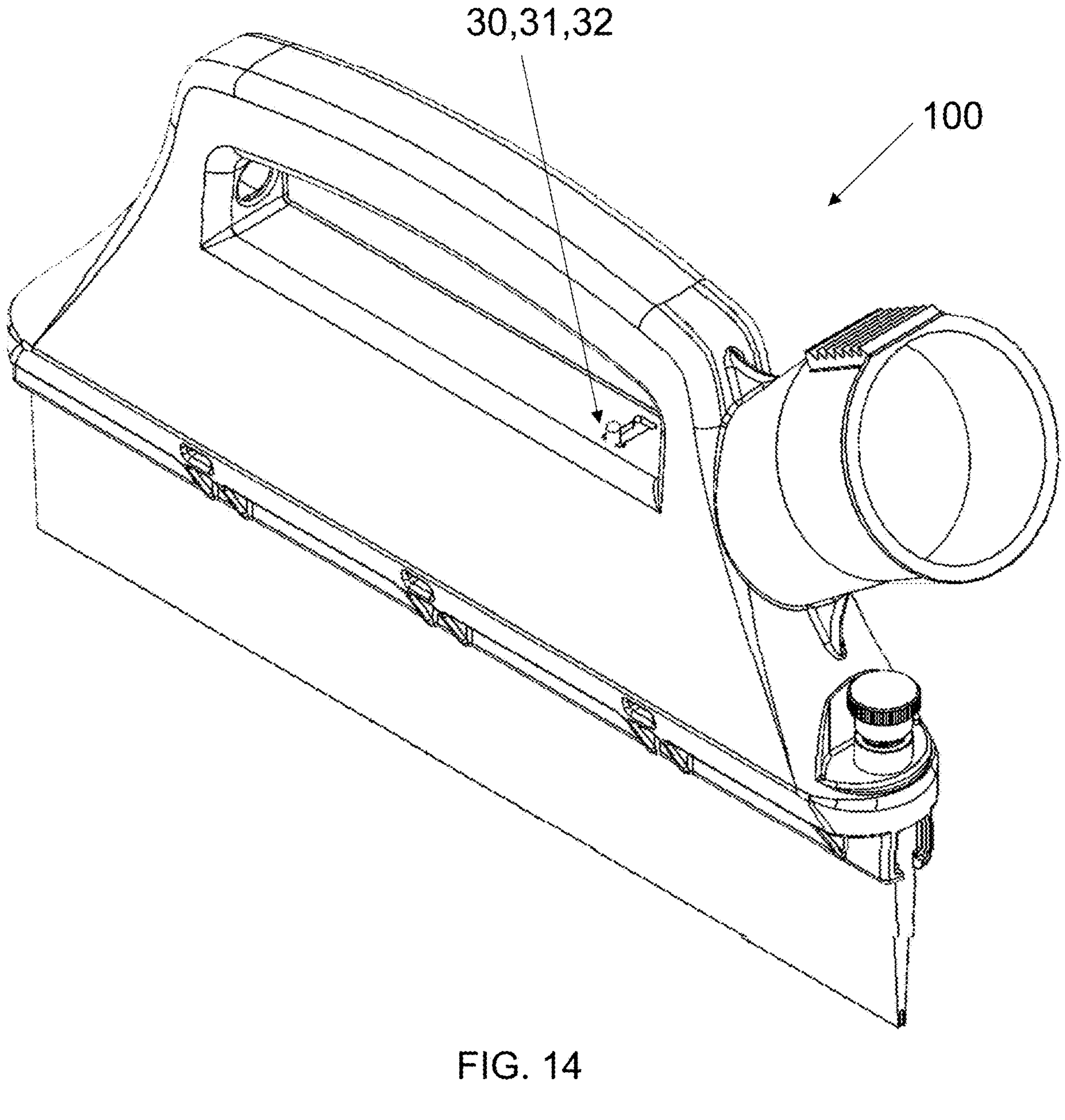
FIG. 14 is an upper front perspective view of another exemplary air blade tool operable as a surface and crevice cleaning tool.

The housing 2 includes openings 5 disposed on the bottom of the housing 2. Referring again to FIGS. 2, 3, and 13, in some embodiments, the openings 5 are disposed at the bottom of the housing 2 along at least a portion of a length from the first to the second end 34, 34' (FIGS. 8 and 9), and a plurality of openings 5 are disposed on both sides of the bottom, facing one another. Yet, in other embodiments, the plurality of openings 5 may be disposed at one side of the bottom of the housing 2, or both sides of the bottom of the housing 2 in a staggered arrangement. The arrangement, sizes, and shapes of openings 5 may vary to meet different needs.

Referring to FIG. 4, the depicted representative embodiment of the blade assembly 11 includes a blade 12 and blade retainer 13. The blade 12 is attached to the blade retainer 13, and the blade 12 is tapered downward and away from the blade retainer seat 4. The blade 12 includes two planar sides. The blade assembly 11 may be replaceable. The blade 12 may be a squeegee 14, wherein squeegee is understood to mean an implement with a rubber or other elastomeric material-edged blade set on a handle. The squeegee 14 can be made from an elastic material, such as, but not limited to, rubber, silicone, plastic, latex, and the like, including combinations thereof, it being understood that the selection of material is not limiting. The squeegee 14 may further include a cloth surface 15 on one side or both. The cloth surface 15 may be, such as, but not limited to, a felt pad, chamois, cotton, synthetic microfiber cloth, and the like.

In other embodiments, the blade 12 may be a cloth scrubber 16. In some examples, the cloth may be formed of natural or synthetic material or combinations thereof. In some embodiments, the cloth may be formed of one of synthetic microfiber, chamois, cotton, or combinations thereof. Yet, in other embodiments, the blade 12 may be a brush 17.

Referring again to the drawings, as shown in FIG. 1, a fastener 6 secures the blade assembly 11 at a predetermined position. Referring to FIGS. 1, 4 and 5, the fastener 6 is disposed at one side of the bottom of the housing 2. The blade assembly 11 is slidably inserted through the blade retainers 4, and the fastener 6 secures the blade assembly 11 at a predetermined position. The fastener 6 may be a bolt, screw, clamp, or pin. The fastener 6 may be made from a plastic material and/or a metal material.

The housing 2 may further include a slot 10. The slot 10 may be threaded. In some embodiments, referring again to FIGS. 1, 4 and 5, the slot 10 is configured to receive a fastener 6, and the fastener 6 may be inserted therethrough and contact and fix the blade retainer 13 of the blade assembly 11 such that the blade assembly 11 is fixedly secured at a predetermined position. When the fastener 6 is released, the blade assembly 11 may no longer be fixedly secured at the predetermined position, and the user of the air blade tool 100 may adjust the position of the blade assembly 11 to another predetermined position or completely remove the blade assembly 11 from the air blade tool 100.

The housing 2 may further include a fastener mounting seat 18. The fastener mounting seat 18 may be disposed above the slot 10 and configured to receive a fastener 6. In some embodiments, referring again to FIGS. 1, 4 and 5, the fastener mounting seat 18 has a threaded portion therein to receive a fastener 6, which in the depicted embodiment is a threaded bolt. The fastener 6 is configured to engage in the fastener mounting seat 18 and through the slot 10 to contact and releasably secure the blade assembly 11 within the air blade tool 100 at a predetermined position. It should be appreciated that other mechanisms, such as clamps, hooks, interlocking channels, or other features may be employed for releasably retaining the blade assembly 11 for replacement.

While the drawings show the fastener mounting seat 18, fastener 6, and slot 10 located at the same end 34, 34', e.g., the first end 34 (or the second end 34'), of the housing 2 as the air conduit assembly 21, it will be appreciated that the fastener mounting seat 18, fastener 6, and slot 10 may be located at the opposite end 34, 34', e.g., the second end 34' (or the first end 34), of the housing 2.

In some embodiments, referring to FIGS. 1-3, the air conduit assembly 21 may further include a swivel fitting 25 at the distal end 24 of the air conduit 22 to allow a hose (not shown) of a mounted air blower (not shown) to rotate on an axis at the distal end 24. Such rotation may be up to 360 degrees. It should be appreciated that other mechanisms, dimensions, and shapes may be employed. In some alternate examples, the conduit may be fitted to the housing 2 via a swivel fitting (not shown) comprising a swivel or ball-type joint within a corresponding aperture in the housing 2, to allow polyaxial movements of the air conduit 22 within the housing aperture to accommodate movement of the air blade tool 100 relative to the attached blower hose. In some such embodiments, the ball-type joint comprises a ball joint having a through channel for the flow of air and engageable within the air conduit 22 and within the housing aperture which has a corresponding ball shaped recess to thereby permit rotation at both junctions of the ball joint with each of the air conduit 22 and the housing 2.

Referring to FIG. 2, the bottom of the housing 2 forms a plane 7, and the plane 7 extends along a longitudinal axis 8. In some embodiments, referring to FIG. 8, the air conduit 22 extends from one end 34, 34' of the housing 2 at its proximal end 23 along a first axis 26 at a first angle 27, and the first angle 27 is defined by the longitudinal axis 8 of the bottom plane 7 of the housing 2 and the first axis 26 of the air conduit 22. The air conduit 22 continues to extend to its distal end 24 along a second axis 28 at a second angle 29. The second angle 29 is defined by the longitudinal axis 8 and the second axis 28. The angles 27, 29 may range from about 0° to about 90°. In some embodiments, the angles 27, 29 may be the same. The angles 27, 29 are configured and function such that the hose (not shown) of the mounted air blower (not shown) does not directly contact the surface of a cleaning area, and the user of the air blade tool 100 is able to operate the tool 100 with one hand while in use. It should be appreciated that other mechanisms, shapes, dimensions, and sizes may be employed.

Figure 15:
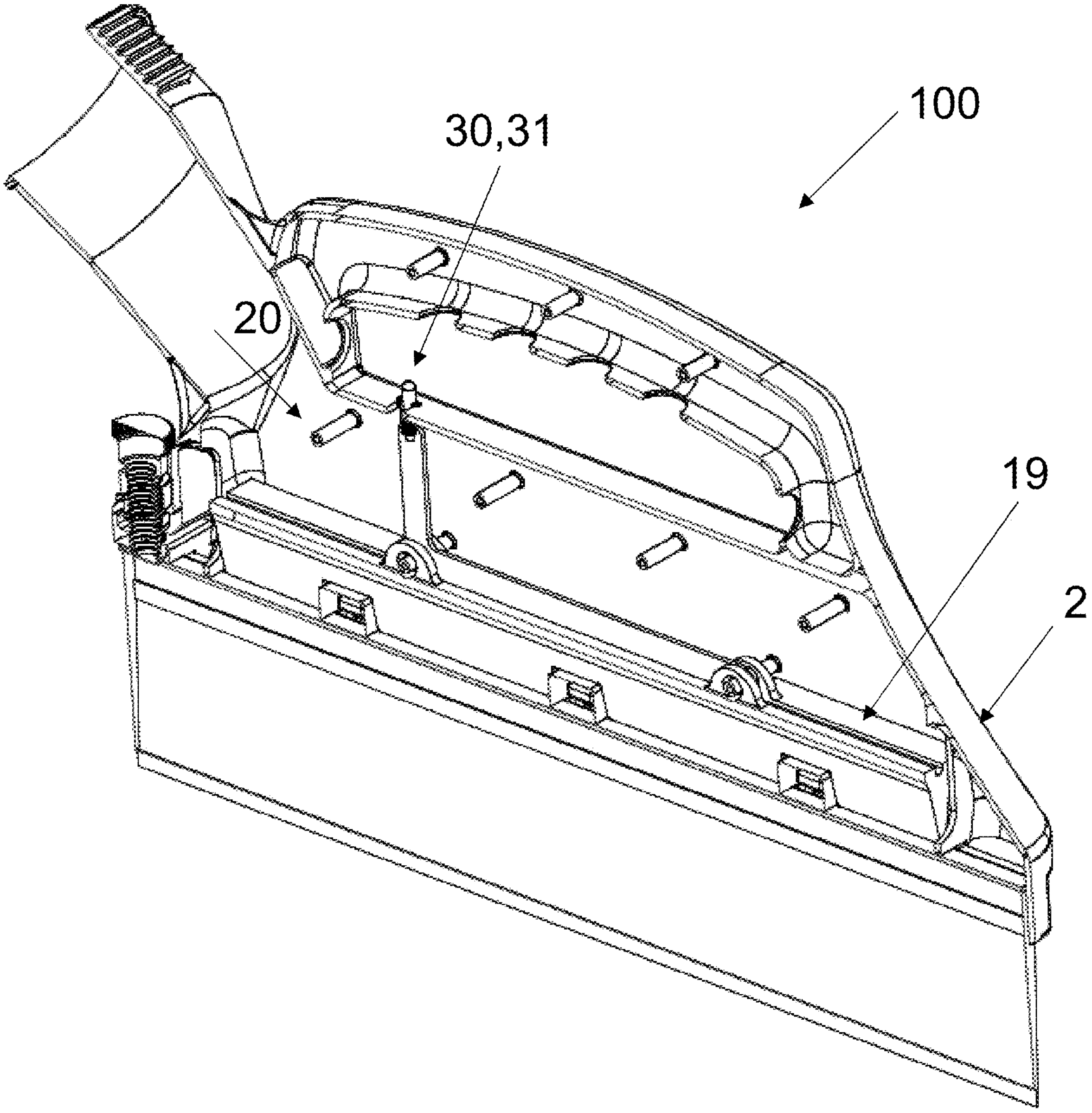
FIG. 15 is a view showing an arrangement of the tool shown in FIG. 14.
Figure 16:
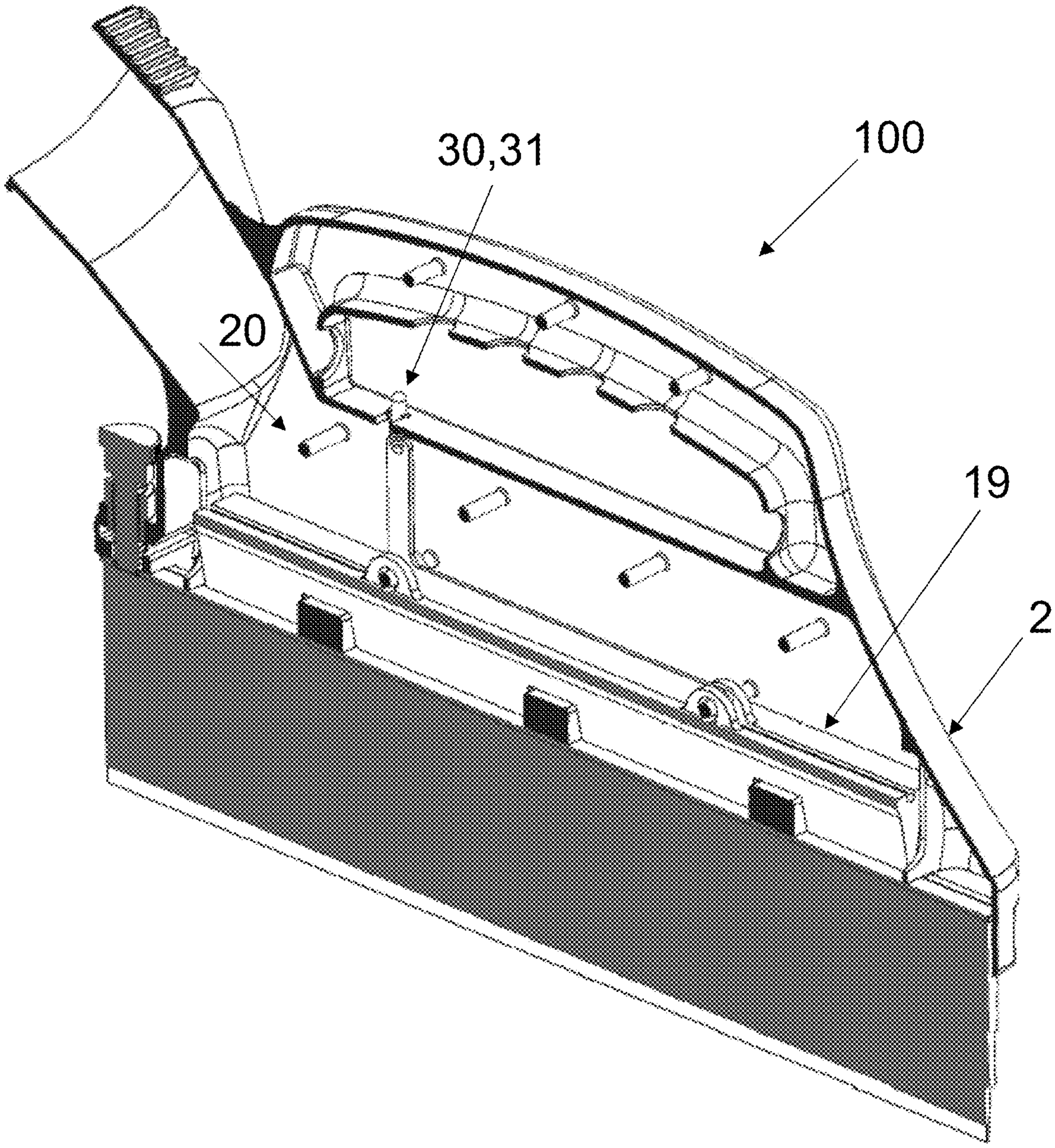
FIG. 16 is a longitudinal cross section view of the tool shown in FIG. 14.
Figure 17:
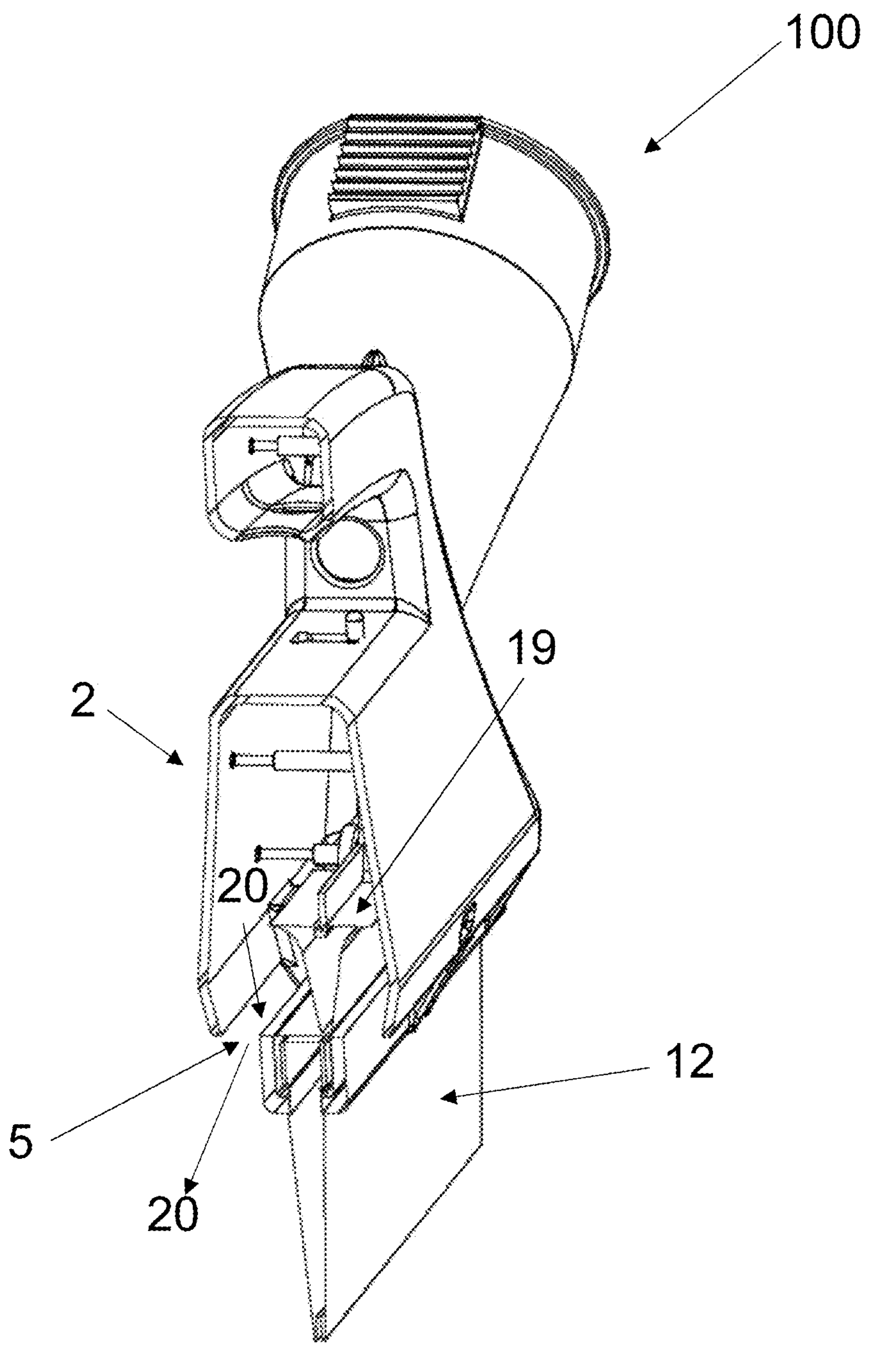
FIG. 17 is a transverse cross section view of the tool shown in FIG. 14.
Figure 18:
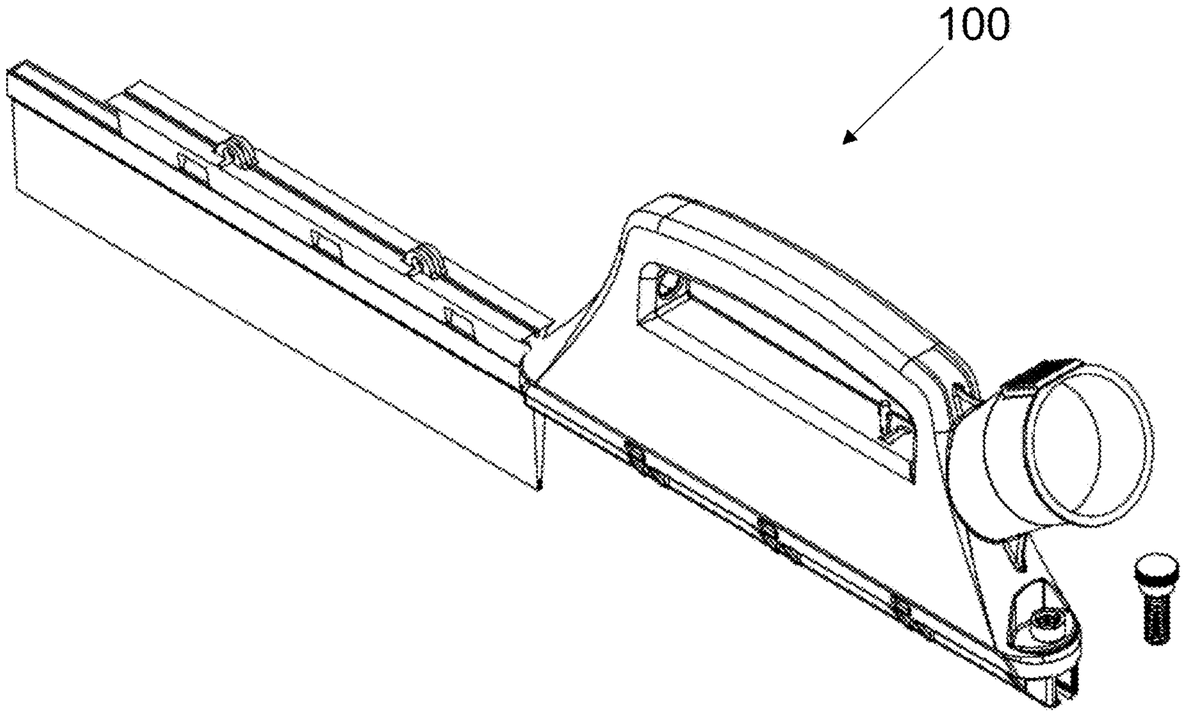
FIG. 18 is an exploded view of the tool shown in FIG. 14.
Figure 19:
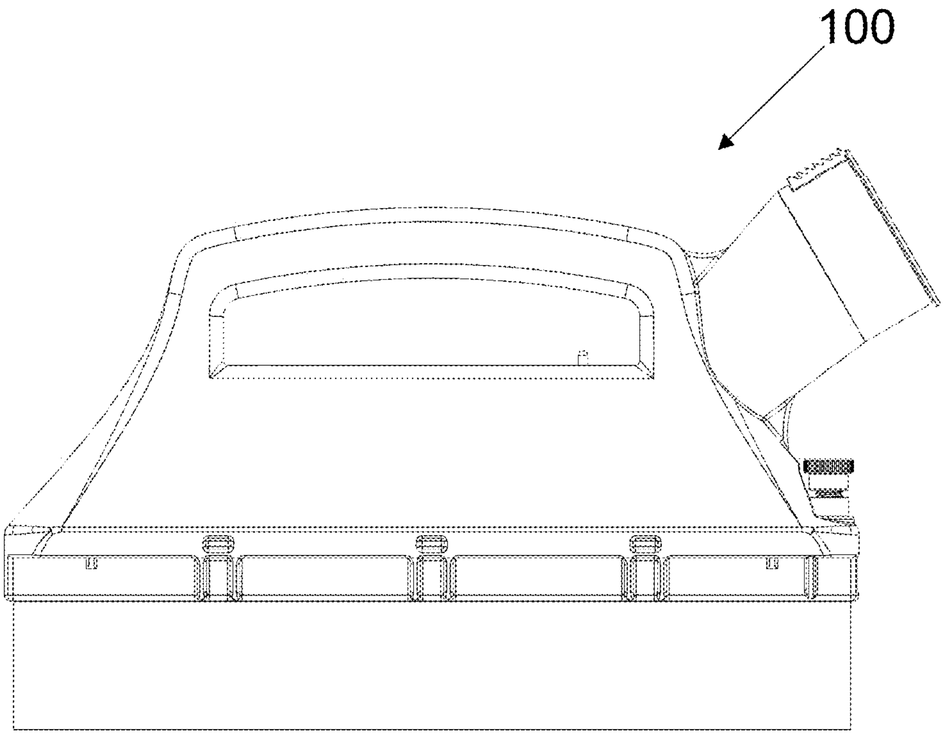
FIG. 19 is a front view of the tool shown in FIG. 14.
Figure 20:
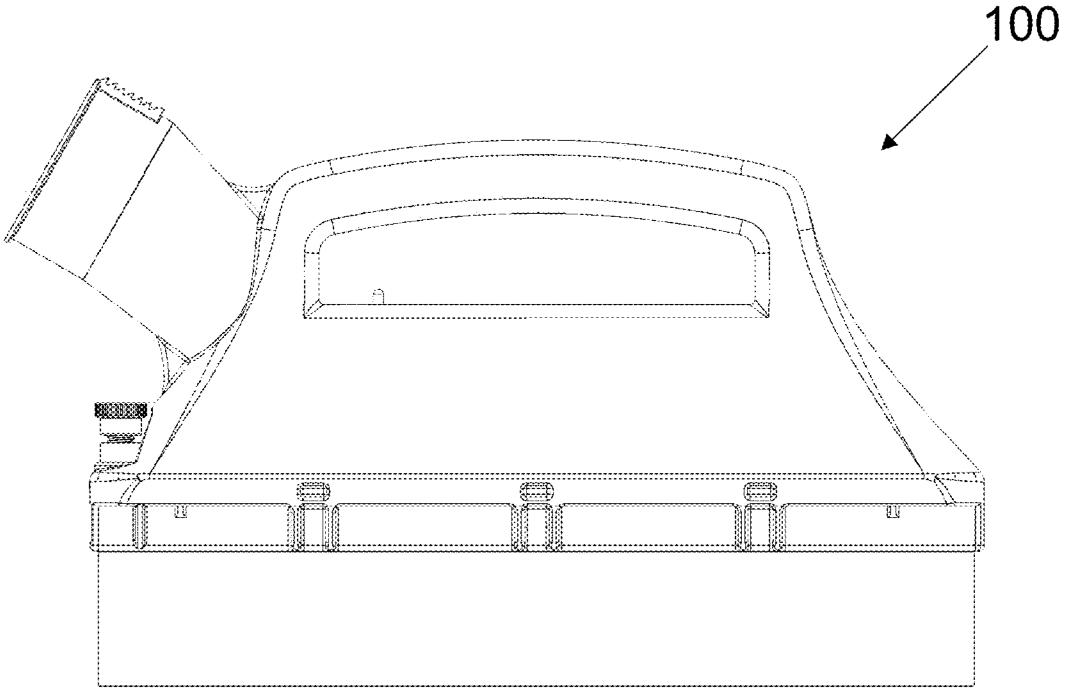
FIG. 20 is a rear view of the tool shown in FIG. 14.
Figure 21:
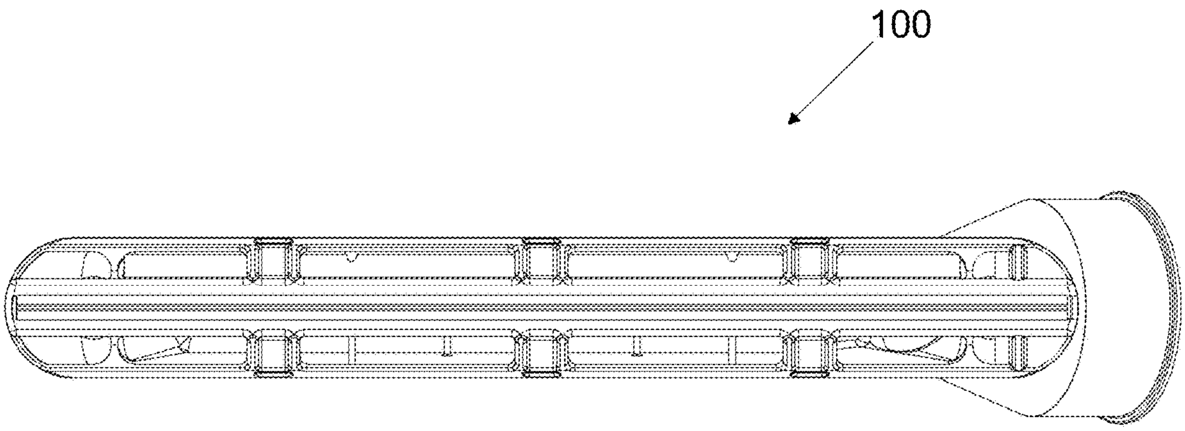
FIG. 21 is a bottom view of the tool shown in FIG. 14.
Figure 22:
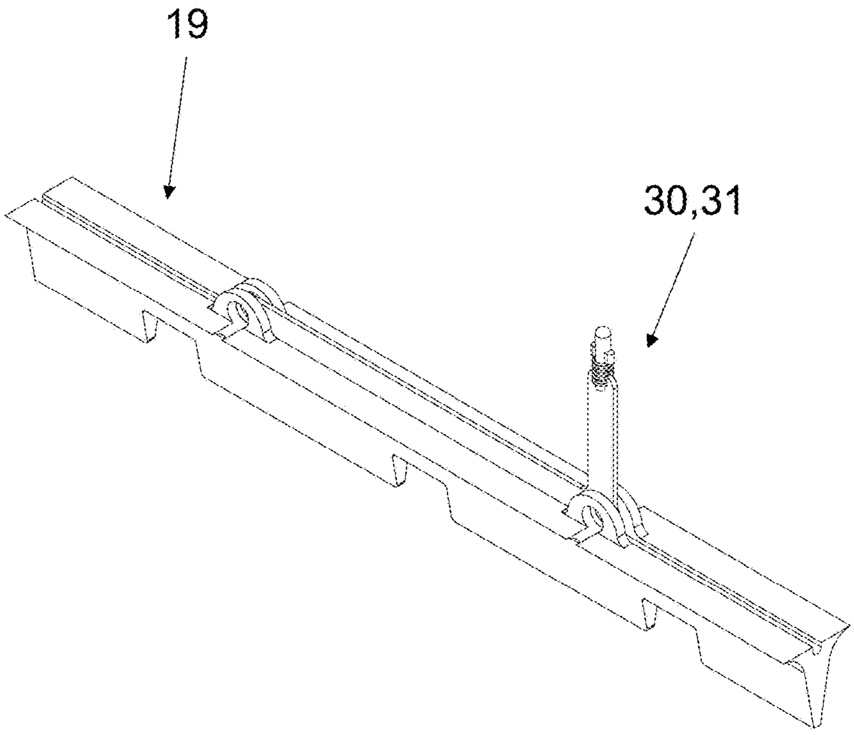
FIG. 22 is an upper front perspective view of an exemplary damper and actuator of the tool shown in FIG. 14.
Figure 23:
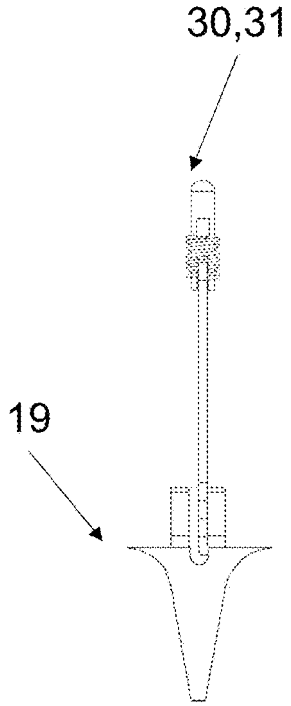
FIG. 23 is a left side view of an exemplary damper and actuator of the tool shown in FIG. 14.

Referring to FIGS. 4 and 5, air supplied from an air blower (not shown) through the air conduit 22 forms air flow 20 inside the housing 2, blows out through openings 5 downward, and removes contaminants on the surface of a cleaning area. In some embodiments, referring to FIGS. 15-17, the housing 2 further includes a damper 19. The damper 19 is positioned within the housing 2 and is configured to be adjustably positionable to be disposed at a predetermined position. The damper 19 is configured such that the damper 19 can redirect the air flow 20 to one side, e.g., the left side openings 5 or right side openings 5, or both, depending on its 19 position. Then the air flow 20 inside the housing 2 may be redirected by the position of the damper 19 to predetermined openings 5 and blow out therethrough. For instance, if the damper 19 is disposed at the center, the air supplied from the air blower (not shown) will blow out through both sides of the openings 5. However, when the damper 19 is disposed to one side, e.g., the right side, such that the damper 19 operates directing the air flow 20 to the opposite side, the air blows out through the openings 5 disposed on the opposite side, e.g., the left side, and removes contaminants thereunder. When the blade 12 is used in concert with the air from the air blade tool 100 to clean the surface of a cleaning area, contaminants, such as greywater, on the surface will be directed by the air from the tool 100 and blade 12 to only one side opposite the blade 12, and the contaminants will not impinge on the other side, e.g., already cleaned areas. It should be appreciated that other mechanisms, shapes, dimensions, and sizes may be employed.

Referring to FIGS. 14-17, 22, and 23, in some embodiments, an actuator 30 can be used to actuate the damper 19 and control the position of the damper 19 inside the housing 2. An actuator 30 may be a switch 31 or a button 32. Referring to FIGS. 14-17, a switch 31 can be disposed at a predetermined position, e.g., the right side, and the damper 19 actuated by the switch 31 sweeps to a predetermined position, e.g., the right side, inside the housing 2 such that the damper 19 can direct air flow 20 to at least one opening 5, e.g., the left side openings 5. The switch 31 can also be disposed at the center, and the damper 19 actuated by the switch 31 sweeps to the center inside the housing 2 such that the damper 19 directs the air flow 20 to both side openings 5, e.g., the left and right side openings 5. The switch 31 can be locked at a predetermined position. Yet, in other embodiments, a button 32 may be used to actuate a damper 19 and control the position of the damper 19. The button 32 may be held in place until released in order to actuate the damper 19 and control the position of the damper 19 inside the housing 2. Alternatively, the button 32 may be toggled in order to actuate the damper 19 and control the position of the damper 19 inside the housing 2. It should be appreciated that other types of actuators 30 can be employed. It should be further appreciated that other mechanisms, shapes, dimensions, and sizes may be employed.

In use, according to the various embodiments, the air blade tool allows for methods of cleaning of surfaces and crevices, for example, the surfaces of cars after cleaning to allow for the removal of water from the surface without introduction of wipe marks and to avoid water spotting. Other uses include removal of particulates and air from surfaces, or from crevices, such as in window wells and other joints.

According to embodiments in which the blade assembly is replaceable, operation of the replaceable blade allows ready switching of blades of different types for different surfaces, or to replace spent blades. According to embodiments in which the air conduit assembly includes a swivel fitting either at the junction of the air conduit with the housing or at the distal end of the air conduit, the swivel ensures that the handle and blade positions remain true to the treated surface despite kinking or winding of a hose affixing the tool to a blower, with the further benefit of avoiding hand fatigue for the user and avoiding interference of the blower/hose with the arm or hand of the user, and with the further benefit of minimizing rubbing or other contact of the blower/hose with the treated surface. According to embodiments in which the tool includes a damper, the damper enables the user to select the direction of air flow to one side, or both sides of the bottom of the housing whereby selection of one side or the other prevents blow back of particulates and water toward a direction of the surface or crevice that has been cleaned or wiped of water.

Following is a listing of representative parts of the air blade tools having the reference numerals as shown in the drawings and included in the description.

TABLE OF REFERENCE NUMERALS

| | |
|---|---|
| Air blade tool for an air blower Operable as a Surface and crevice cleaning tool | 100 |
| Housing Assembly | 1 |
| Housing | 2 |
| Handle | 3 |
| Blade Retainer Seat | 4 |
| Opening | 5 |
| Fastener | 6 |
| Plane | 7 |
| Longitudinal Axis | 8 |
| Aperture | 9 |
| Slot | 10 |
| Blade Assembly | 11 |
| Blade | 12 |
| Blade Retainer | 13 |
| Squeegee | 14 |
| Cloth Surface | 15 |
| Cloth Scrubber | 16 |
| Brush | 17 |
| Fastener Mounting Seat | 18 |
| Damper | 19 |
| Air Flow | 20 |
| Air Conduit Assembly | 21 |
| Air Conduit | 22 |
| Proximal End (Air Conduit) | 23 |
| Distal End (Air Conduit) | 24 |
| Swivel Fitting | 25 |
| First Axis | 26 |
| First Angle | 27 |
| Second Axis | 28 |
| Second Angle | 29 |
| Actuator | 30 |
| Switch | 31 |
| Button | 32 |
| Support | 33 |
| First End | 34 |
| Second End | 34' |

While the invention has been described with reference to a preferred embodiment, it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An air blade tool operable as a surface and crevice cleaning tool, the air blade tool comprising:

a housing assembly including:

a housing having a top and bottom and a hollow inside, and first and second ends;

a handle extending from the housing at a first side and at a second side and disposed at the top of the housing and along a length of the housing between its first and second ends, the handle and housing forming an aperture therebetween;

a blade retainer seat disposed along and extending from the bottom of the housing such that the blade retainer seat is a lowermost portion of the housing assembly and configured to slidably receive a blade assembly; and a plurality of openings disposed at the bottom of the housing for emitting air, the plurality of openings vertically spaced from the lowermost portion of the housing assembly;

the blade assembly comprising at least one blade extending from the blade retainer seat; and an air conduit assembly including an air conduit having a proximal end and distal end, the air conduit connected at its proximal end to extend from the first or second end of the housing and adapted at its distal end for mounting to an air blower, such that air supplied from the air blower through the air conduit forms air flow inside the housing and out through at least one of the plurality of openings, wherein the blade assembly is replaceable, and the housing assembly includes a fastener, a fastener mounting seat, and a port configured to receive the fastener, wherein the fastener is configured to engage in the fastener mounting seat and through the port to contact and releasably secure the blade assembly within the air blade tool at a predetermined position.

2. The air blade tool of claim 1, wherein the at least one blade is adapted for engagement within the blade retainer seat.

3. The air blade tool of claim 1, wherein the blade assembly includes the at least one blade and a blade retainer, wherein the blade retainer is either integral with the at least one blade or is affixed to the at least one blade, the blade retainer adapted for engagement within the blade retainer seat.

4. The air blade tool of claim 1, wherein the fastener is selected from the group consisting of a bolt, a screw, a clamp, a pin, and combinations thereof.

5. The air blade tool of claim 1, wherein the at least one blade is one of a squeegee, a cloth scrubber, and a brush.

6. The air blade tool of claim 1, wherein the at least one blade is tapered downward and away from the blade retainer seat.

7. The air blade tool of claim 1, wherein the at least one blade includes a squeegee that includes a cloth surface on at least one side.

8. The air blade tool of claim 1, wherein the at least one blade includes a squeegee formed from an elastic material.

9. The air blade tool of claim 8, wherein the elastic material is a rubber, a silicone, or a combination thereof.

10. The air blade tool of claim 1, wherein the air conduit extends from one end of the housing at the proximal end along a first axis at a first angle and continues to extend to the distal end along a second axis at a second angle.

11. The air blade tool of claim 1, wherein the air conduit includes a cylindrical hollow tube, and the air conduit assembly further comprises a swivel fitting to allow rotation of a hose relative to the air blade tool when fitted to the air conduit.

12. The air blade tool of claim 1, wherein the housing assembly further comprises a damper, the air flow inside the housing directed by the position of the damper to at least one predetermined opening of the plurality of openings.

13. The air blade tool of claim 1, wherein the blade retainer seat includes a lower contact point with the blade extending downward beyond the remainder of the housing.

14. An air blade tool, comprising:

a housing assembly including:

a housing having a top and bottom and a hollow inside, and first and second ends;

a handle extending from the housing and disposed at the top of the housing;

a blade retainer seat fixedly disposed along the bottom of the housing and configured to slidably receive a blade assembly;

the blade assembly received by the blade retainer seat, the blade assembly comprising a blade extending past the bottom of the housing;

at least one first opening disposed at the bottom of the housing on a first side of the blade and at least one second opening disposed at the bottom of the housing on a second side of the blade opposite the first side for emitting air;

a damper positioned within the housing and configured to be adjustably positionable between at least a first position and a second position lateral to the first position within the housing, the damper configured to adjustably direct air flow inside the housing to at least one of the first plurality and the second plurality of openings; and an actuator on the housing configured to control the position of the damper between the first position and the section position; and an air conduit assembly including an air conduit having a proximal end and distal end, the air conduit connected at its proximal end to extend from the first or second end of the housing and adapted at its distal end for mounting to an air blower, whereby air supplied from the air blower through the air conduit forms air flow inside the housing;

wherein the blade retainer seat includes a lower contact surface, for engagement with the blade, with the lower contact surface extending downward beyond the remainder of the housing, wherein the air blade tool is operable as a surface and crevice cleaning tool upon mounting the distal end of the air conduit to the air blower, and wherein when the damper is at the first position, the damper covers the first plurality of openings and redirects air to the second plurality of openings and when the damper is at the second position, the damper covers the second plurality of openings and redirects air to the first plurality of openings.

15. The air blade tool of claim 14, wherein the actuator is configured to be toggled to a predetermined position, and the predetermined position comprises at least one predetermined position.

16. The air blade tool of claim 14, wherein the blade assembly is replaceable, and the housing assembly includes a fastener, a fastener mounting seat, and a port configured to receive the fastener, wherein the blade retainer seat is configured to slidably receive the blade assembly, and the fastener is configured to engage in the fastener mounting seat and through the port to contact and secure the blade assembly within the air blade tool at a predetermined position, and wherein the blade assembly includes the blade and a blade retainer, wherein the blade retainer is either integral with the blade or is affixed to the blade, and the blade retainer is adapted for engagement within the blade retainer seat.

17. The air blade tool of claim 14, wherein the blade is one of a squeegee, a cloth scrubber, and a brush.

18. The air blade tool of claim 14, wherein the air conduit includes a swivel fitting to allow rotation of a hose relative to the air blade tool when fitted to the air conduit.

19. An air blade tool operable as a surface and crevice cleaning tool, the air blade tool comprising:

a housing assembly including:

a housing having a top and bottom and a hollow inside, and first and second ends;

a handle extending from the housing at a first side and at a second side and disposed at the top of the housing and along a length of the housing between its first and second ends, the handle and housing forming an aperture therebetween;

a blade retainer seat disposed along the bottom of the housing and configured to slidably receive a blade assembly; and a plurality of openings disposed at the bottom of the housing for emitting air;

the blade assembly comprising at least one blade extending from the blade retainer seat; and an air conduit assembly including an air conduit having a proximal end and distal end, the air conduit connected at its proximal end to extend from the first or second end of the housing and adapted at its distal end for mounting to an air blower, such that air supplied from the air blower through the air conduit forms air flow inside the housing and out at least one of the plurality of openings, wherein the blade retainer seat and the housing are integrally formed as a unitary structure, and wherein the blade assembly is replaceable, and the housing assembly includes a fastener, a fastener mounting seat, and a port configured to receive the fastener, wherein the fastener is configured to engage in the fastener mounting seat and through the port to contact and releasably secure the blade assembly within the air blade tool at a predetermined position.

20. The air blade tool of claim 1, wherein the blade retainer seat and the housing are integrally formed as a unitary structure.

* * * * *